United States Patent [19]

Mohan

[11] Patent Number: 4,671,831
[45] Date of Patent: Jun. 9, 1987

[54] METHOD OF MANUFACTURE OF LARGE HIGH PRESSURE COMPOSITE BOTTLES

[75] Inventor: Raja Mohan, Salt Lake City, Utah

[73] Assignee: Edo Corporation Fiber Science Division, Utah

[21] Appl. No.: 769,018

[22] Filed: Aug. 26, 1985

[51] Int. Cl.⁴ .......................................... B65H 81/00
[52] U.S. Cl. ..................... 156/69; 156/156; 156/172; 156/182; 156/266
[58] Field of Search ............... 156/169, 172, 175, 173, 156/193, 264, 266, 69, 156, 425, 182

[56] References Cited

U.S. PATENT DOCUMENTS

| | | | |
|---|---|---|---|
| 3,210,228 | 10/1965 | Bluck | 156/172 |
| 3,282,757 | 11/1966 | Brusee | 156/172 |
| 3,615,983 | 10/1971 | Palfreyman et al. | 156/175 |
| 3,655,468 | 4/1972 | Bastone et al. | 156/69 |
| 3,804,687 | 4/1974 | Peterson | 156/172 |
| 4,242,160 | 12/1980 | Pinter | 156/425 |
| 4,453,995 | 6/1984 | Morrisey | 156/182 |

Primary Examiner—Michael Ball
Attorney, Agent, or Firm—Thorpe, North & Western

[57] ABSTRACT

A method of manufacture of large high pressure composite bottles. In accordance with the method, polar caps are placed on the ends of a reusable mandrel, which is then coated with an appropriate mold release and then coated or at least covered with a material which will become the internal protective coating for the finished bottle, and then coated with an impervious liner material. Thereafter, a few layers of windings of high strength resin impregnated filament are put on the mandrel and the resin is cured to make the internal protective coating and liner self-supporting. The resulting thin shell is then cut circumferentially near the middle thereof and the two halves are removed from the mandrel, then rebonded together so that the thin shell may act as a self-supporting mandrel over which the structural shell of the bottle is subsequently wound. This allows the original mandrel to be used over and over again as desired. Various details and variations of the method are disclosed.

14 Claims, 4 Drawing Figures

METHOD OF MANUFACTURE OF LARGE HIGH PRESSURE COMPOSITE BOTTLES

BACKGROUND OF THE INVENTION

The present invention relates to the field of manufacture of composite high pressure vessels.

Composite high pressure vessels and methods of manufacture thereof are well known in the prior art. By way of example, nonmagnetic scuba tanks had been manufactured by winding a resin impregnated high strength filament on a mandrel comprising an inert liner and one or more end pieces or polar rings for providing a means for air communication with the vessel. Normally winding precedes back and forth across the liner, encircling the polar ring in some manner to integrate the polar ring into the overall structure, the resin being cured on completion of the winding to complete the pressure vessel. In some instances, the inner lining may be preformed by blow molding or the like, and is sufficiently self-supporting, particularly when slightly pressurized to itself serve as the winding mandrel. In other instances, some form of collapsible mandrel may be used, or alternatively, a readily dissolvable mandrel may be used which, of course, is dissolved out of the finished bottle after curing the resin.

The foregoing techniques work well for the manufacture of relatively small pressure vessels but are not suitable for large pressure vessels. In particular, an inert liner for a large pressure vessel is not sufficiently self-supporting to adequately serve as a winding mandrel unless the liner is unreasonably thick. In that regard, liner thicknesses need not be proportional to pressure vessel size, as in any event the liner thickness need only be sufficient to be impervious to the fluid or gas to be contained therein. Collapsible mandrels, on the other hand, are relatively expensive at best, and are particularly expensive for large sizes. Similarly, dissolvable mandrels in large sizes are unreasonably expensive and time consuming to dissolve away.

SUMMARY OF THE INVENTION

It is an object of the invention to provide a new and improved method of manufacturing large high pressure composite bottles.

It is also an object of the invention to provide such a method which is relatively inexpensive and allows for the reuse of at least some of the manufacturing implements.

The above and other objects of the invention are realized in accordance with the method of the invention in which polar caps are placed on the ends of a reusable mandrel, which is then coated with an appropriate mold release. The mandrel is then coated or at least covered with a material which will become the internal protective coating for the finished bottle, and then coated with an impervious liner material. Thereafter, a few layers of windings of high strength resin impregnated filament are put on the mandrel and the resin is cured to make the internal protective coating and liner self-supporting. The resulting thin shell is then cut circumferentially near the middle thereof and the two halves are removed from the mandrel, then rebonded together so that the thin shell may act as a self-supporting mandrel over which the structural shell of the bottle is subsequently wound. This allows the original mandrel to be used over and over again as desired. Various details and variations of the method are disclosed.

BRIEF DESCRIPTION OF THE DRAWINGS

The objects, features and advantages of the invention will be apparent from a consideration of the following detailed description which is presented in connection with the accompanying drawings in which.

DETAILED DESCRIPTION OF THE INVENTION

In certain applications, it is desirable or mandatory to provide relatively large pressure vessels which are relatively lightweight, safe, durable and highly corrosion resistant. By way of example, offshore drilling operations may require pressure vessels of a size of 2 to 7 feet in diameter, 10 to 28 feet in length and having a pressure capability of 100 to 3,000 psi. The environment within which these vessels are used is particularly severe, not only including direct and reflected sunlight and salt water but also including various types of solvents, acids and other corrosive materials indigenous to the various grades of crude oil which may be encountered. It is a method of manufacture of pressure vessels of this type to which the present invention is directed, the present invention not being limited to but being particularly suitable for the manufacture of such large, durable and corrosion resistant pressure vessels. Thus, in order to provide specificity in the exemplary description to follow, the method of manufacture of a pressure vessel on the order of 20 feet long and 5 feet in diameter will be described. In pressure vessels of the type generally described, it is not uncommon to connect a plurality of such vessels in series as though the plurality of such vessels are all part of one long larger pressure vessel. Accordingly, typically a polar ring will be provided at each end of the vessel, each polar ring comprising an internally threaded fitting having a flange at the inner end thereof which will be entrapped within the finished vessel.

Figure 1:
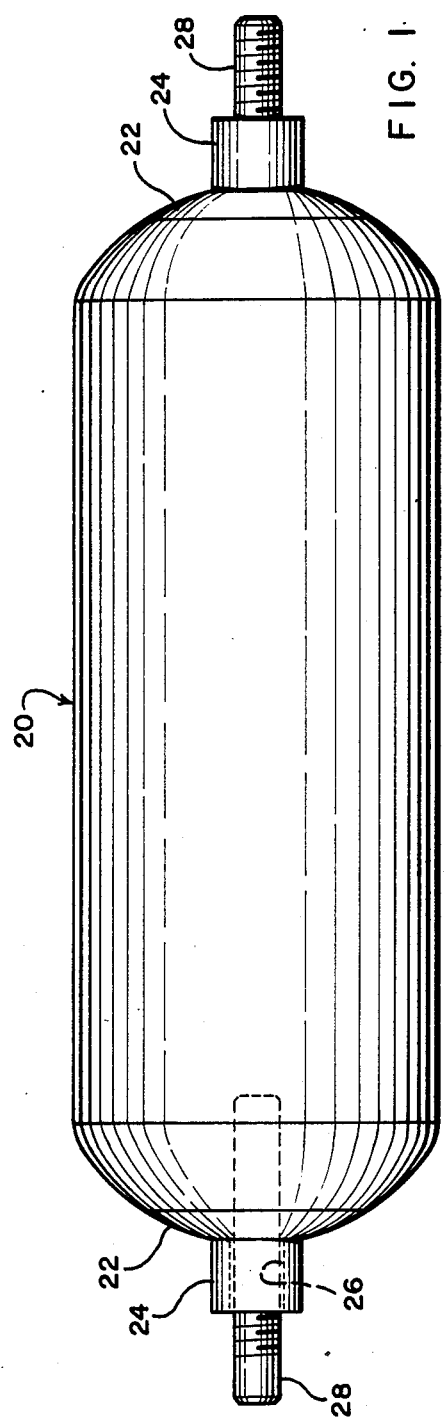
FIG. 1 is a side view of a mandrel together with polar end caps and mounting pins.

In accordance with the present invention method, as shown in FIG. 1, a mandrel 20 is first fabricated, being cooperatively configured so as to accept a polar ring 22 at each end thereof so that the mandrel 20 and polar rings 22 combine to form a smooth spherical surface at the end of the mandrel, terminating at the protrusion 24 integral with and forming a part of the polar ring 22. For purposes of connection to the finished bottle, the polar ring and projection contain internal threads which may be continued into the end of the mandrel 20, so that a support pin may be threaded thereinto at each end of the mandrel for support and rotational drive of the mandrel. Thus, as may be seen in FIG. 1, threads 26 are provided in the end of the mandrel for receipt of a threaded support pin 28 for centering, support and drive of the mandrel. Alternatively, pin 28 may be a threaded, but stepped inward at the mandrel end thereof so that the mandrel may have a smaller bore for receipt of the pin. In general, however, at least at the drive end of the mandrel, the pin 28 should be nonrotatably connected to the mandrel so that the mandrel and pin always rotate in unison. Obviously, this may be achieved in other ways also such as, by way of example, using a square or other noncircularly shaped inner end on pin 28 and corresponding noncircular hole along the axis of the mandrel 20.

The mandrel 20 may be fabricated utilizing any of various techniques, giving due regard to its size. In particular the mandrel has a volume on the order of hundreds of cubic feet, so that a solid mandrel will normally not be practical for weight and cost reasons. Therefore, the mandrel more preferably is some form of hollow mandrel, or alternatively a foam filled mandrel using some appropriate formed, machined and/or molded ends and center cylindrical section supported in the cylindrical shape by an appropriate structure. The other surface of the mandrel preferably is a relatively durable material such as by way of example, aluminum or a resin impregnated and coated fiberglass or other high strength relatively lightweight filament.

The polar rings normally used may be any of a relatively large number of materials selected based upon the strength and stiffness, and temperature and other environmental requirements and capabilities desired. Such materials would include, but not necessarily be limtied to, aluminum, titanium, stainless steel and glass reinforced nylon.

Figure 2:
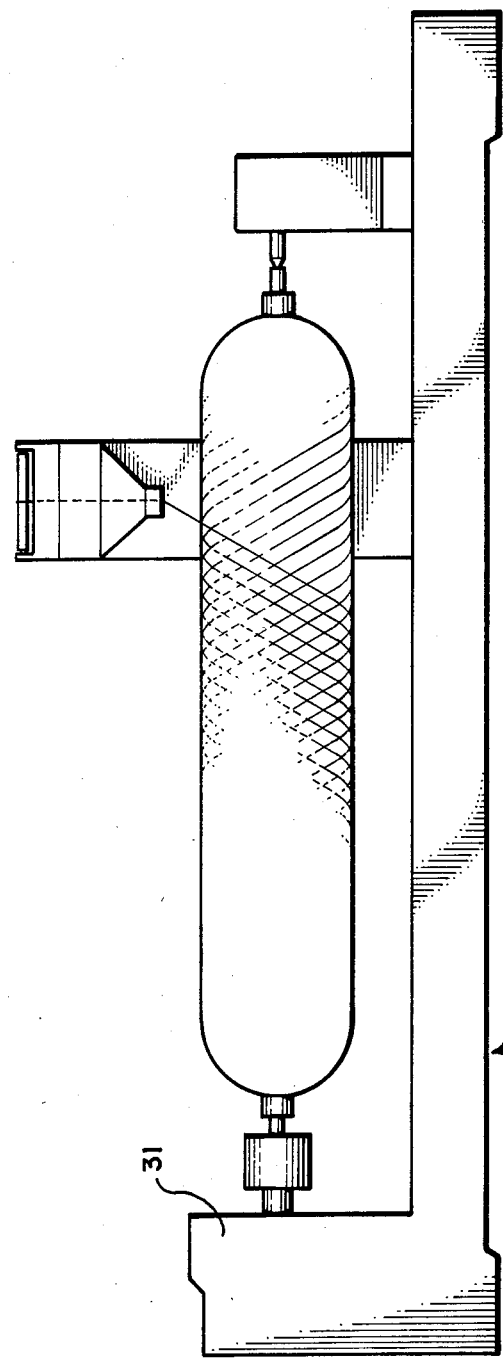
FIG. 2 is a schematic diagram illustrating the winding of the thin shell which will be used as a self-supporting mandrel, and also representative of the winding of the finished pressure vessel.

The mandrel-polar ring-support pin assembly, once prepared, is then mounted in an appropriate winding machine shown schematically as winding machine 30 to FIG. 2. The winding machine includes drive means 31 at least one end thereof for driving the entire mandrel in rotation along its polar axis in a controlled manner. Such winding machines are well known in the prior art and therefore need not be described in great detail herein. After mounting, as shown, the mandrel (not including the polar rings) is typically coated with an appropriate mold release to prevent adherence to the mandrel of subsequent layers placed thereover. Suitable mold releases are well known in the prior art and readily commercially available. In most cases the mandrel will then be coated with a layer which will act as an internal protective coating in the finished pressure vessel to keep caustic fluids and gases from the next layer, referred to herein as the liner. Such internal protective coatings may be in the form of a sprayed or painted coating, or even an appropriate film, depending on the requirements of the internal fluids to be encountered. Some of the possible internal coating materials include vinyl esters, urethanes, Tedlar, Saran and nylon. On certain applications, however, this internal protective coating is not required as the liner itself about to be described herein may provide adequate protection for the expected fluids and gases.

The mandrel is next coated with a liner material as referred to above, selected to be substantially impervious to the liquids and gases to be contained therein, and also so as to render the bottle pressure type. Obviously the liner material must be capable of resisting whatever chemicals it may be subjected to and various environmental ranges which may be expected. Preferably the liner is applied as an uncured resin or other liquid in one or more layers and cured or dried as appropriate to provide a liner thickness on the order of 0.060 of an inch. Suitable materials for use as liners include Hytrel, a polyester elastomer manufactured by Dupont, acrilonitrile-butadiene-styrene copolymers, nitrile-butadiene rubber, various urethanes styrene-butadiene rubbers, ethylene-propylene-diene monomers and natural rubber.

Thereafter, winding of the pressure vessel is initiated utilizing one or more strands or rovings of high strength filament, starting at one polar ring, winding helically along the mandrel to the other polar ring, at least partially wrapping or encircling that polar ring and returning along the mandrel in an oppositely coiled helical wind. Suitable high strength filaments include glass, Kevlar, graphite, nylon and boron, to name a few. Such winding progresses from end to end with the wind around the polar rings at each end being such that each helical wind lies immediately adjacent the prior helical wind. The filament may be impregnated with an appropriate resin after each layer or few layers is applied, though preferably the filament is resin impregnated by passing through a resin bath and appropriate excess resin remover, as is well known in the prior art, immediately prior to its being wound onto the mandrel. In any event, in the preferred embodiment winding proceeds to a point until a sufficient thickness of winding has been built up so that the resulting shell, upon curing of the resin, will be self-supporting without the mandrel. Typically in pressure vessels of the size contemplated by the present invention, approximately 5 or 6 winding layers are provided for this purpose. When such thickness has been attained the winding is stopped and the resin cured.

Figure 3:
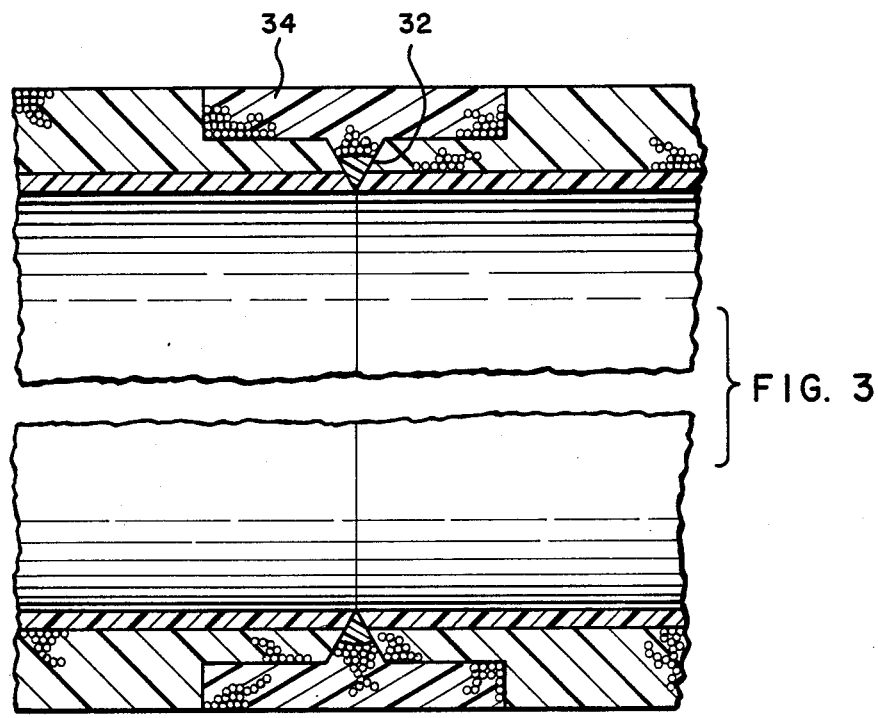
FIG. 3 is a cross-section taken on an expanded scale of the thin shell vessel as cut, separated from the mandrel and rejoined to form a self-supporting mandrel.

At this point, the winding, liner and internal protective coating layer, if used, is cut circumferentially on the cylindrical portion of the mandrel, preferably adjacent to center thereof using a relatively accurately machined cut to penetrate to the mandrel. Various types of cuts may be used, though certain forms are preferred over others, as they facilitate the rejoining of the two halves after they are removed from the mandrel. Preferably the mandrel is provided with a slight draft from the point the cut will be made to facilitate removal of the two halves of the shell therefrom. In particular, as shall be seen, a cut as shown in FIG. 3 has certain advantages in the present invention. Once the cut is made, the two winding halves, together with the liner and internal protective coating which now comprise integral assemblies, are removed from the mandrel, and then with appropriate fixturing rebutted as shown in FIG. 3 so that they may be appropriately rejoined. For this purpose, additional liner and/or protective coating material may be put into the "V" joint 32 between the two halves, if desired, to maintain the integrity of the liner and/or protective coating at that point, and then a short helical wind of a resin coated filament strand or roving may be made in the scarfed area 34 to tie the two cured halves together with significant strength.

Figure 4:
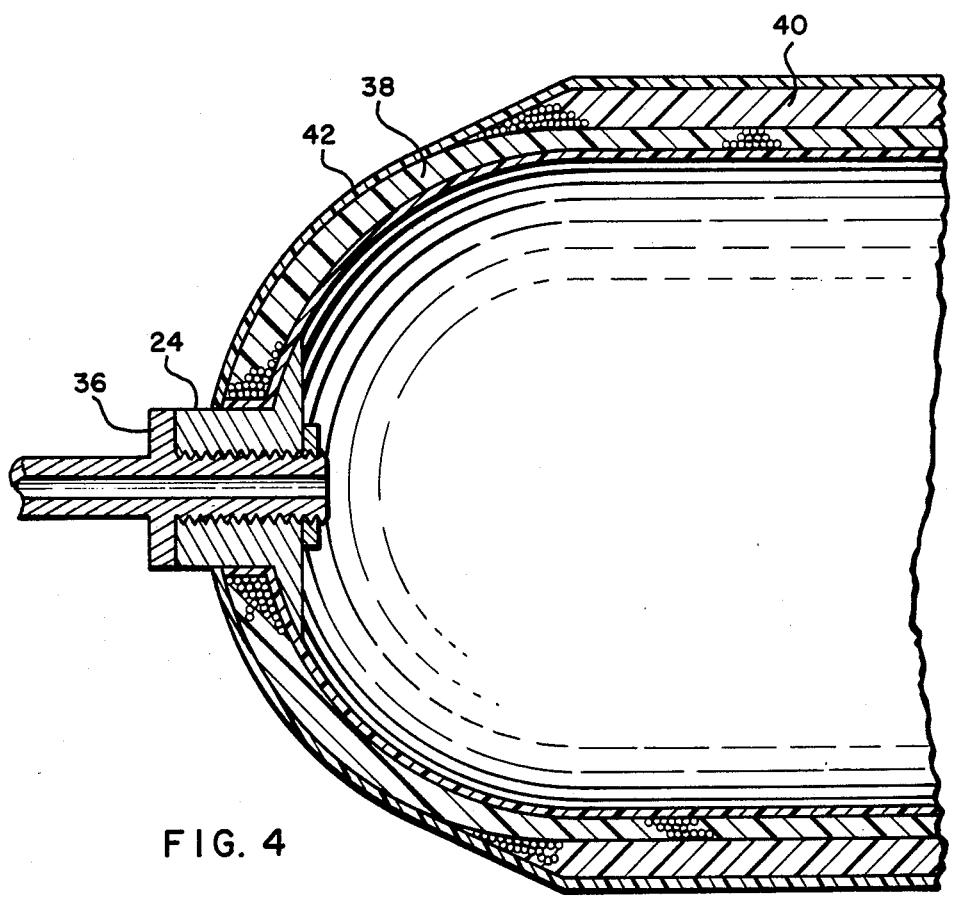
FIG. 4 is a cross-section of an end portion of a finished pressure vessel illustrating (with exaggerated thicknesses) the various layers making up the finished pressure vessel.

Up to this point a very thin wall vessel has been fabricated which is quite structurally weak and which has at best only a very low pressure capability. Of particular importance, however is the fact that this very thin wall vessel is self-supporting and itself can be used, either unpressurized or with a very low pressurization, as the winding mandrel for the winding of the ultimate pressure vessel thereover. As such, the thin-walled vessel may be mounted on end pins such as the end pin 36 shown on FIG. 4 and remounted on a winding machine, such as that illustrated in FIG. 2, for the winding of the completed vessel to proceed, using the thin shelled vessel as the mandrel therefor. As may be seen in FIG. 4, preferably at least one of end pins 36 has a hole through the center thereof, which in conjunction with a rotary pressure fitting on the winding machine, as is known in the prior art, may be used to slightly pressurize the thin shelled vessel for added stability thereof, and to continually increase the pressure within the vessel as winding of the finished vessel progresses to offset the winding tension, thereby maintaining the same tension in the filaments previously wound as in the filaments then currently being wound.

Pins 36 of course provide the rotary drive for the winding of the finished vessel, and accordingly must be positively angularly fixed within the polar ring 24, at least at the drive end of the winding machine, either by being threaded relatively firmly thereinto or alternatively by the use of some other positive angular orientation of these two parts.

An analysis of cylindrical pressure vessels having spherical end caps shows that the vessel will have a circumferential stress in the cylindrical section which is twice the longitudinal stress in the cylindrical section and throughout the spherical sections. In addition, the thickness of the windings tends to increase at the ends of the pressure vessel, as windings laid side by side in the cylindrical section will increasingly lay over each other as they go around the spherical area and wrap at least part way around the polar rings 24. Consequently, as may be seen in FIG. 4, the finished windings in the preferred embodiment are comprised of a plurality of layers 38 of helically wound strands, with an additional plurality of circumferentially wound strands 40 thereover to provide increased hoop strength in the cylindrical section. In the preferred embodiment the helical windings comprise a thickness in the cylindrical region on the order of 1/32nd of an inch or more, with the cylindrical winding being on the order of twice the thickness of the helical windings. Obviously, of course, the various winding parameters may be varied as desired such as, by way of example, the helical winding angle may be varied (the typical numbers hereinbefore provided being for a helical wind on the order of 45 degrees), the cylindrical windings 40 may comprise helical windings of definite but relatively small angle, may be internal to or disbursed at two or more positions in the helical windings 38, etc. Also, if desired, doilylike members of woven filament may be placed in the region of the polar rings 24, either internal to or external to the windings 38 to provide added strength and/or provide wear resistance to the finished pressure vessel. In that regard it is desirable to provide a final outer layer selected for wear resistance, as typical materials used for composite winding, particularly the high strength filament materials, are extremely strong in tension though relatively weak in shear. Similarly, protection against impact and atmospheric conditions is also desirable because of the characteristics of the composite structure. Suitable protective coatings may be either in the form of a coating which is sprayed or painted on, or a film which is applied after the structural wall is cured, or even a film which is applied after the final ply is wound prior to the curing thereof. Selection of the external protective coating material will depend upon the appropriate atmospheric and abrasion resistance requirements, with suitable materials including urethanes, acrylics, Saran, Tedlar and Teflon. An external coating is not always required depending upon the exact intended use of the pressure vessel, though is desirable in most applications to make the pressure vessel more versatile and to accommodate reasonable variations in the intended use thereof. Of course, while the pressure vessels described herein are conventional cylindrical pressure vessels (perhaps with a slight draft) and with spherical end caps, obviously the method of the present invention is applicable to the manufacture of pressure vessel of other configurations, such as by way of example, purely spherical pressure vessels and to pressure vessels having additional features or characteristics, such as by way of example, pressure vessels having mounting feet and the like integrated into the composite structure by the prefabrication of the mounting means and the integration therof into at least some of the winding layers to integrate the mounting means into the finished composite structure.

Using the method of the present invention, a single reusable mandrel may be fabricated and repeatedly reused to fabricate large pressure vessels on a substantially continuous basis. By way of example, for the pressure vessels of the size contemplated by the present invention, a single mandrel may be used to wind the thin shell which will provide the self-supporting mandrel for subsequent lining of the finished pressure vessel, with the thin shell being finished in a single day. Upon separation of the thin shell from the mandrel, another thin shell may be fabricated using the same mandrel the next day. Similarly, finished pressure vessels may be completed within a single day once the thin shell has been rejoined, so that the winding of a finished vessel may proceed at the same time the winding of a thin shell vessel for the mandrel for the next vessel is being fabricated. In this way, a single mandrel may be used to maintain a relatively high production rate, considering the nature of the product involved, thereby minimizing to the maximum extent possible the required special equipment.

Obviously, while the present invention has been disclosed and described with respect to preferred methods of practicing the same, it will be understood by those skilled in the art that various changes in method may be made without departing from the spirit and scope of the invention.

What is claimed is:

1. A method of fabricating large pressure vessels comprising the steps of
   (a) preparing a winding mandrel and supporting the winding mandrel on a winding machine;
   (b) winding a thin shelled composite structure on said mandrel utilizing a high strength filament, the composite structure being impregnated by resin;
   (c) curing the resin;
   (d) cutting the thin shelled composite structure and separating the parts of the structure from the mandrel;
   (e) rejoining the parts of the structure along the cut made in step (d);
   (f) supporting the rejoined thin shelled composite structure on a winding machine;
   (g) winding the remainder of the pressure vessel on the thin shelled composite structure utilizing high strength filament, the composite structure being impregnated by resin; and
   (h) curing the resin.
2. The method of claim 1 wherein the thin shelled composite structure is pressurized during step (g) to maintain approximately the same tension in the filaments previously wound in step (g) as those currently being wound.

3. The method of claim 1 wherein the pressure vessel is impregnated by resin as a result of the high strenth filament being passed through a bath of resin prior to being wound during step (g) of the method.

4. The method of claim 1 wherein step (a) comprises placing polar caps on opposite ends of the mandrel and supporting the mandrel via the polar caps on the winding machine.

5. The method of claim 1 wherein the composite structure wound in step (b) is impregnated by resin as a result of the high strength filament being passed through a bath of resin prior to being wound.

6. The method of claim 1 further comprising the step of coating the mandrel with a mold release material prior to step (b).

7. The method of claim 6 further comprising the step of covering the mandrel, after the step of claim 6, with an internal protective coating which is substantially impervious to caustic fluids and gases.

8. The method of claim 1 further comprising the step of covering said mandrel with a liner material prior to step (b).

9. The method of claim 8 wherein the liner material is coated onto the mandrel.

10. The method of claim 9 wherein step (d) comprises cutting the thin shelled composite structure so that the liner material is partly exposed at the cut formed in step (d) when the parts are positioned for rejoining, and wherein step (e) includes the step of rejoining the parts whereby the liner material is again made continuous over the cut.

11. The method of claim 10 wherein step (d) also comprises cutting the thin shelled structure with a relief so that short helical winds may be made across the relief in step (e) so that the thin shelled composite structure may be rejoined by the helical winds without creating a bulge at the region of the cut.

12. The method of claim 1 wherein step (d) comprises cutting the thin shelled composite materials circumferentially.

13. The method of claim 1 wherein the winding step of step (g) comprises the winding of layers at different winding angles.

14. The method of claim 13 wherein step (g) further comprises winding the pressure vessel with first layers of helically wound strands, and with second layers of circumferentially wound strands.

* * * * *